US012203397B2

(12) United States Patent
Martinez et al.

(10) Patent No.: US 12,203,397 B2
(45) Date of Patent: Jan. 21, 2025

(54) IMPACT ENERGY ABSORBER WITH INTEGRATED ENGINE EXHAUST NOISE MUFFLER

(71) Applicant: DIVERGENT TECHNOLOGIES, INC., Los Angeles, CA (US)

(72) Inventors: Antonio Bernerd Martinez, Los Angeles, CA (US); Yong-Bae Cho, Los Angeles, CA (US); John Russell Bucknell, Los Angeles, CA (US); Michael Vasile, Los Angeles, CA (US); Michael Bolton, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 200 days.

(21) Appl. No.: 17/178,048

(22) Filed: Feb. 17, 2021

(65) Prior Publication Data

US 2021/0254522 A1    Aug. 19, 2021

Related U.S. Application Data

(60) Provisional application No. 62/978,232, filed on Feb. 18, 2020.

(51) Int. Cl.
    *F01N 1/02*      (2006.01)
    *B33Y 80/00*    (2015.01)
    (Continued)

(52) U.S. Cl.
    CPC ............... *F01N 1/02* (2013.01); *B33Y 80/00* (2014.12); *B60R 19/02* (2013.01); *B62D 21/152* (2013.01);
    (Continued)

(58) Field of Classification Search
    CPC . F01N 1/02; F01N 1/023; F01N 1/026; F01N 2470/02; F01N 13/1811;
    (Continued)

(56) References Cited

U.S. PATENT DOCUMENTS

RE22,283 E  *  3/1943  Bourne ................... F01N 1/023
                                                              181/248
5,203,226 A      4/1993  Hongou et al.
(Continued)

FOREIGN PATENT DOCUMENTS

CN         210033596 U      2/2020
DE     102013223733 A1  *  6/2014   ............. B60R 19/20
(Continued)

OTHER PUBLICATIONS

US 9,202,136 B2, 12/2015, Schmidt et al. (withdrawn)
(Continued)

*Primary Examiner* — Jeremy A Luks
(74) *Attorney, Agent, or Firm* — ARENTFOX SCHIFF LLP

(57) ABSTRACT

Multifunction noise suppression and crash structures are disclosed. In one aspect of the disclosure, the multifunction structure includes a body, inlet and outlet pipes, and a plurality of walls within the body that bound resonator cells and that are configured to suppress exhaust noise passing through the resonator cells from the inlet to the outlet pipes. The structure may be positioned between crash rails at the rear of the vehicle and between the engine and bumper. The walls may be generally aligned with, or near, the predicted impact direction and they may crumple in a controlled manner during an impact. In various embodiments the structure is 3D printed to enable construction of a wide diversity of geometric topologies and to minimize mass.

36 Claims, 11 Drawing Sheets

(51) Int. Cl.
*B60R 19/02* (2006.01)
*B62D 21/15* (2006.01)
*F01N 13/18* (2010.01)
*G10K 11/162* (2006.01)
*G10K 11/172* (2006.01)

(52) U.S. Cl.
CPC ........ *F01N 13/1811* (2013.01); *G10K 11/162* (2013.01); *G10K 11/172* (2013.01); *F01N 2470/02* (2013.01)

(58) Field of Classification Search
CPC ............. F01N 2470/18; F01N 2470/22; F01N 2490/15; F01N 2490/155; B33Y 80/00; B60R 19/02; G10K 11/162; G10K 11/172; B62D 21/152
USPC ........................................................ 181/282
See application file for complete search history.

(56) References Cited

U.S. PATENT DOCUMENTS

| | | | |
|---|---|---|---|
| 5,726,398 | A | 3/1998 | Zahn et al. |
| 5,742,385 | A | 4/1998 | Champa |
| 5,990,444 | A | 11/1999 | Costin |
| 6,010,155 | A | 1/2000 | Rinehart |
| 6,096,249 | A | 8/2000 | Yamaguchi |
| 6,140,602 | A | 10/2000 | Costin |
| 6,250,533 | B1 | 6/2001 | Otterbein et al. |
| 6,252,196 | B1 | 6/2001 | Costin et al. |
| 6,318,642 | B1 | 11/2001 | Goenka et al. |
| 6,365,057 | B1 | 4/2002 | Whitehurst et al. |
| 6,391,251 | B1 | 5/2002 | Keicher et al. |
| 6,409,930 | B1 | 6/2002 | Whitehurst et al. |
| 6,468,439 | B1 | 10/2002 | Whitehurst et al. |
| 6,554,345 | B2 | 4/2003 | Jonsson |
| 6,585,151 | B1 | 7/2003 | Ghosh |
| 6,595,319 | B1 * | 7/2003 | Huff .................. F01N 13/20 181/250 |
| 6,644,721 | B1 | 11/2003 | Miskech et al. |
| 6,811,744 | B2 | 11/2004 | Keicher et al. |
| 6,866,497 | B2 | 3/2005 | Saiki |
| 6,919,035 | B1 | 7/2005 | Clough |
| 6,926,970 | B2 | 8/2005 | James et al. |
| 7,152,292 | B2 | 12/2006 | Hohmann et al. |
| 7,344,186 | B1 | 3/2008 | Hausler et al. |
| 7,500,373 | B2 | 3/2009 | Quell |
| 7,586,062 | B2 | 9/2009 | Heberer |
| 7,637,134 | B2 | 12/2009 | Burzlaff et al. |
| 7,710,347 | B2 | 5/2010 | Gentilman et al. |
| 7,716,802 | B2 | 5/2010 | Stern et al. |
| 7,730,996 | B2 | 6/2010 | Van de Flier et al. |
| 7,745,293 | B2 | 6/2010 | Yamazaki et al. |
| 7,766,123 | B2 | 8/2010 | Sakurai et al. |
| 7,852,388 | B2 | 12/2010 | Shimizu et al. |
| 7,908,922 | B2 | 3/2011 | Zarabadi et al. |
| 7,951,324 | B2 | 5/2011 | Naruse et al. |
| 8,094,036 | B2 | 1/2012 | Heberer |
| 8,163,077 | B2 | 4/2012 | Eron et al. |
| 8,286,236 | B2 | 10/2012 | Jung et al. |
| 8,289,352 | B2 | 10/2012 | Vartanian et al. |
| 8,297,096 | B2 | 10/2012 | Mizumura et al. |
| 8,354,170 | B1 | 1/2013 | Henry et al. |
| 8,383,028 | B2 | 2/2013 | Lyons |
| 8,408,036 | B2 | 4/2013 | Reith et al. |
| 8,429,754 | B2 | 4/2013 | Jung et al. |
| 8,437,513 | B1 | 5/2013 | Derakhshani et al. |
| 8,444,903 | B2 | 5/2013 | Lyons et al. |
| 8,452,073 | B2 | 5/2013 | Taminger et al. |
| 8,579,077 | B2 * | 11/2013 | Ahn .................. F01N 1/04 181/254 |
| 8,599,301 | B2 | 12/2013 | Dowski, Jr. et al. |
| 8,606,540 | B2 | 12/2013 | Haisty et al. |
| 8,610,761 | B2 | 12/2013 | Haisty et al. |
| 8,631,996 | B2 | 1/2014 | Quell et al. |
| 8,675,925 | B2 | 3/2014 | Derakhshani et al. |
| 8,678,060 | B2 | 3/2014 | Dietz et al. |
| 8,686,314 | B2 | 4/2014 | Schneegans et al. |
| 8,686,997 | B2 | 4/2014 | Radet et al. |
| 8,694,284 | B2 | 4/2014 | Berard |
| 8,720,876 | B2 | 5/2014 | Reith et al. |
| 8,752,166 | B2 | 6/2014 | Jung et al. |
| 8,755,923 | B2 | 6/2014 | Farahani et al. |
| 8,787,628 | B1 | 7/2014 | Derakhshani et al. |
| 8,818,771 | B2 | 8/2014 | Gielis et al. |
| 8,873,238 | B2 | 10/2014 | Wilkins |
| 8,978,535 | B2 | 3/2015 | Ortiz et al. |
| 9,006,605 | B2 | 4/2015 | Schneegans et al. |
| 9,071,436 | B2 | 6/2015 | Jung et al. |
| 9,101,979 | B2 | 8/2015 | Hofmann et al. |
| 9,104,921 | B2 | 8/2015 | Derakhshani et al. |
| 9,126,365 | B1 | 9/2015 | Mark et al. |
| 9,128,476 | B2 | 9/2015 | Jung et al. |
| 9,138,924 | B2 | 9/2015 | Yen |
| 9,149,988 | B2 | 10/2015 | Mark et al. |
| 9,156,205 | B2 | 10/2015 | Mark et al. |
| 9,186,848 | B2 | 11/2015 | Mark et al. |
| 9,244,986 | B2 | 1/2016 | Karmarkar |
| 9,248,611 | B2 | 2/2016 | Divine et al. |
| 9,254,535 | B2 | 2/2016 | Buller et al. |
| 9,266,566 | B2 | 2/2016 | Kim |
| 9,269,022 | B2 | 2/2016 | Rhoads et al. |
| 9,327,452 | B2 | 5/2016 | Mark et al. |
| 9,329,020 | B1 | 5/2016 | Napoletano |
| 9,332,251 | B2 | 5/2016 | Haisty et al. |
| 9,346,127 | B2 | 5/2016 | Buller et al. |
| 9,389,315 | B2 | 7/2016 | Bruder et al. |
| 9,399,256 | B2 | 7/2016 | Buller et al. |
| 9,403,235 | B2 | 8/2016 | Buller et al. |
| 9,418,193 | B2 | 8/2016 | Dowski, Jr. et al. |
| 9,457,514 | B2 | 10/2016 | Schwärzler |
| 9,469,057 | B2 | 10/2016 | Johnson et al. |
| 9,478,063 | B2 | 10/2016 | Rhoads et al. |
| 9,481,402 | B1 | 11/2016 | Muto et al. |
| 9,486,878 | B2 | 11/2016 | Buller et al. |
| 9,486,960 | B2 | 11/2016 | Paschkewitz et al. |
| 9,502,993 | B2 | 11/2016 | Deng |
| 9,525,262 | B2 | 12/2016 | Stuart et al. |
| 9,533,526 | B1 | 1/2017 | Nevins |
| 9,551,265 | B2 * | 1/2017 | Darrell .................... F01N 1/083 |
| 9,555,315 | B2 | 1/2017 | Aders |
| 9,555,580 | B1 | 1/2017 | Dykstra et al. |
| 9,557,856 | B2 | 1/2017 | Send et al. |
| 9,566,742 | B2 | 2/2017 | Keating et al. |
| 9,566,758 | B2 | 2/2017 | Cheung et al. |
| 9,573,193 | B2 | 2/2017 | Buller et al. |
| 9,573,225 | B2 | 2/2017 | Buller et al. |
| 9,586,290 | B2 | 3/2017 | Buller et al. |
| 9,595,795 | B2 | 3/2017 | Lane et al. |
| 9,597,843 | B2 | 3/2017 | Stauffer et al. |
| 9,600,929 | B1 | 3/2017 | Young et al. |
| 9,609,755 | B2 | 3/2017 | Coull et al. |
| 9,610,737 | B2 | 4/2017 | Johnson et al. |
| 9,611,667 | B2 | 4/2017 | GangaRao et al. |
| 9,616,623 | B2 | 4/2017 | Johnson et al. |
| 9,626,487 | B2 | 4/2017 | Jung et al. |
| 9,626,489 | B2 | 4/2017 | Nilsson |
| 9,643,361 | B2 | 5/2017 | Liu |
| 9,662,840 | B1 | 5/2017 | Buller et al. |
| 9,665,182 | B2 | 5/2017 | Send et al. |
| 9,672,389 | B1 | 6/2017 | Mosterman et al. |
| 9,672,550 | B2 | 6/2017 | Apsley et al. |
| 9,676,145 | B2 | 6/2017 | Buller et al. |
| 9,684,919 | B2 | 6/2017 | Apsley et al. |
| 9,688,032 | B2 | 6/2017 | Kia et al. |
| 9,690,286 | B2 | 6/2017 | Hovsepian et al. |
| 9,700,966 | B2 | 7/2017 | Kraft et al. |
| 9,703,896 | B2 | 7/2017 | Zhang et al. |
| 9,713,903 | B2 | 7/2017 | Paschkewitz et al. |
| 9,718,302 | B2 | 8/2017 | Young et al. |
| 9,718,434 | B2 | 8/2017 | Hector, Jr. et al. |
| 9,724,877 | B2 | 8/2017 | Flitsch et al. |
| 9,724,881 | B2 | 8/2017 | Johnson et al. |
| 9,725,178 | B2 | 8/2017 | Wang |

(56) References Cited

U.S. PATENT DOCUMENTS

| | | |
|---|---|---|
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |

(56) References Cited

U.S. PATENT DOCUMENTS

| | | | |
|---|---|---|---|
| 10,272,862 B2 | 4/2019 | Whitehead | |
| 10,275,564 B2 | 4/2019 | Ridgeway et al. | |
| 10,279,580 B2 | 5/2019 | Evans et al. | |
| 10,285,219 B2 | 5/2019 | Fetfatsidis et al. | |
| 10,286,452 B2 | 5/2019 | Buller et al. | |
| 10,286,603 B2 | 5/2019 | Buller et al. | |
| 10,286,961 B2 | 5/2019 | Hillebrecht et al. | |
| 10,289,263 B2 | 5/2019 | Troy et al. | |
| 10,289,875 B2 | 5/2019 | Singh et al. | |
| 10,291,193 B2 | 5/2019 | Dandu et al. | |
| 10,294,552 B2 | 5/2019 | Liu et al. | |
| 10,294,982 B2 | 5/2019 | Gabrys et al. | |
| 10,295,989 B1 | 5/2019 | Nevins | |
| 10,303,159 B2 | 5/2019 | Czinger et al. | |
| 10,307,824 B2 | 6/2019 | Kondoh | |
| 10,310,197 B1 | 6/2019 | Droz et al. | |
| 10,313,651 B2 | 6/2019 | Trevor et al. | |
| 10,315,252 B2 | 6/2019 | Mendelsberg et al. | |
| 10,336,050 B2 | 7/2019 | Susnjara | |
| 10,337,542 B2 | 7/2019 | Hesslewood et al. | |
| 10,337,952 B2 | 7/2019 | Bosetti et al. | |
| 10,339,266 B2 | 7/2019 | Urick et al. | |
| 10,343,330 B2 | 7/2019 | Evans et al. | |
| 10,343,331 B2 | 7/2019 | McCall et al. | |
| 10,343,355 B2 | 7/2019 | Evans et al. | |
| 10,343,724 B2 | 7/2019 | Polewarczyk et al. | |
| 10,343,725 B2 | 7/2019 | Martin et al. | |
| 10,350,823 B2 | 7/2019 | Rolland et al. | |
| 10,356,341 B2 | 7/2019 | Holzer et al. | |
| 10,356,395 B2 | 7/2019 | Holzer et al. | |
| 10,357,829 B2 | 7/2019 | Spink et al. | |
| 10,357,957 B2 | 7/2019 | Buller et al. | |
| 10,359,756 B2 | 7/2019 | Newell et al. | |
| 10,369,629 B2 | 8/2019 | Mendelsberg et al. | |
| 10,382,739 B1 | 8/2019 | Rusu et al. | |
| 10,384,393 B2 | 8/2019 | Xu et al. | |
| 10,384,416 B2 | 8/2019 | Cheung et al. | |
| 10,389,410 B2 | 8/2019 | Brooks et al. | |
| 10,391,710 B2 | 8/2019 | Mondesir | |
| 10,392,097 B2 | 8/2019 | Pham et al. | |
| 10,392,131 B2 | 8/2019 | Deck et al. | |
| 10,393,315 B2 | 8/2019 | Tyan | |
| 10,400,080 B2 | 9/2019 | Ramakrishnan et al. | |
| 10,401,832 B2 | 9/2019 | Snyder et al. | |
| 10,403,009 B2 | 9/2019 | Mariampillai et al. | |
| 10,406,750 B2 | 9/2019 | Barton et al. | |
| 10,412,283 B2 | 9/2019 | Send et al. | |
| 10,416,095 B2 | 9/2019 | Herbsommer et al. | |
| 10,421,496 B2 | 9/2019 | Swayne et al. | |
| 10,421,863 B2 | 9/2019 | Hasegawa et al. | |
| 10,422,478 B2 | 9/2019 | Leachman et al. | |
| 10,425,793 B2 | 9/2019 | Sankaran et al. | |
| 10,427,364 B2 | 10/2019 | Alves | |
| 10,429,006 B2 | 10/2019 | Tyan et al. | |
| 10,434,573 B2 | 10/2019 | Buller et al. | |
| 10,435,185 B2 | 10/2019 | Divine et al. | |
| 10,435,773 B2 | 10/2019 | Liu et al. | |
| 10,436,038 B2 | 10/2019 | Buhler et al. | |
| 10,438,407 B2 | 10/2019 | Pavanaskar et al. | |
| 10,440,351 B2 | 10/2019 | Holzer et al. | |
| 10,442,002 B2 | 10/2019 | Benthien et al. | |
| 10,442,003 B2 | 10/2019 | Symeonidis et al. | |
| 10,449,696 B2 | 10/2019 | Elgar et al. | |
| 10,449,737 B2 | 10/2019 | Johnson et al. | |
| 10,461,810 B2 | 10/2019 | Cook et al. | |
| 2006/0108783 A1 | 5/2006 | Ni et al. | |
| 2010/0071990 A1* | 3/2010 | Amir | F01N 13/08 |
| | | | 181/228 |
| 2012/0267001 A1 | 10/2012 | Otsuka et al. | |
| 2014/0277669 A1 | 9/2014 | Nardi et al. | |
| 2016/0290208 A1 | 10/2016 | Darrell | |
| 2017/0113344 A1 | 4/2017 | Schönberg | |
| 2017/0321581 A1* | 11/2017 | Spieth | F01N 13/08 |
| 2017/0341309 A1 | 11/2017 | Piepenbrock et al. | |
| 2018/0051608 A1* | 2/2018 | Lee | F01N 1/026 |
| 2019/0055876 A1 | 2/2019 | Willats et al. | |

FOREIGN PATENT DOCUMENTS

| | | | |
|---|---|---|---|
| DE | 102013214612 A1 | 1/2015 | |
| DE | 102016105914 A1 | 10/2016 | |
| EP | 0352838 A1 * | 1/1990 | |
| FR | 2873746 A1 * | 2/2006 | B60K 13/04 |
| FR | 3069888 A1 | 2/2019 | |
| FR | 3074220 A1 * | 5/2019 | B60K 13/04 |
| JP | S5336616 U | 3/1978 | |
| JP | S6057716 U | 4/1985 | |
| JP | 2001323809 A * | 11/2001 | |
| JP | 2004036402 A | 2/2004 | |
| JP | 2005-329758 A | 12/2005 | |
| JP | 2012-166612 A | 9/2012 | |
| JP | 2013-091410 A | 5/2013 | |
| JP | 2014118892 A | 6/2014 | |
| JP | 2016-216016 A | 12/2016 | |
| JP | 2017-020496 A | 1/2017 | |
| JP | 2017-210121 A | 11/2017 | |
| JP | 2019070347 A * | 5/2019 | B60K 13/04 |
| JP | 2021-116757 A | 8/2021 | |
| KR | 10-2007-0050937 A | 5/2007 | |
| KR | 20090060821 A | 6/2009 | |
| WO | 1996036455 A1 | 11/1996 | |
| WO | 1996036525 A1 | 11/1996 | |
| WO | 1996038260 A1 | 12/1996 | |
| WO | 2003024641 A1 | 3/2003 | |
| WO | 2004108343 A1 | 12/2004 | |
| WO | 2005093773 A1 | 10/2005 | |
| WO | 2006018581 A1 | 2/2006 | |
| WO | 2007003375 A1 | 1/2007 | |
| WO | 2007110235 A1 | 10/2007 | |
| WO | 2007110236 A1 | 10/2007 | |
| WO | 2008019847 A1 | 2/2008 | |
| WO | 2007128586 A3 | 6/2008 | |
| WO | 2008068314 A2 | 6/2008 | |
| WO | 2008086994 A1 | 7/2008 | |
| WO | 2008087024 A1 | 7/2008 | |
| WO | 2008107130 A1 | 9/2008 | |
| WO | 2008138503 A1 | 11/2008 | |
| WO | 2008145396 A1 | 12/2008 | |
| WO | 2009083609 A2 | 7/2009 | |
| WO | 2009098285 A1 | 8/2009 | |
| WO | 2009112520 A1 | 9/2009 | |
| WO | 2009135938 A1 | 11/2009 | |
| WO | 2009140977 A1 | 11/2009 | |
| WO | 2010125057 A2 | 11/2010 | |
| WO | 2010125058 A1 | 11/2010 | |
| WO | 2010142703 A2 | 12/2010 | |
| WO | 2011032533 A1 | 3/2011 | |
| WO | 2014016437 A1 | 1/2014 | |
| WO | 2014187720 A1 | 11/2014 | |
| WO | 2014195340 A1 | 12/2014 | |
| WO | 2015193331 A1 | 12/2015 | |
| WO | 2016116414 A1 | 7/2016 | |
| WO | 2017036461 A1 | 3/2017 | |
| WO | 2019030248 A1 | 2/2019 | |
| WO | 2019042504 A1 | 3/2019 | |
| WO | 2019048010 A1 | 3/2019 | |
| WO | 2019048498 A1 | 3/2019 | |
| WO | 2019048680 A1 | 3/2019 | |
| WO | 2019048682 A1 | 3/2019 | |

OTHER PUBLICATIONS

US 9,809,265 B2, 11/2017, Kinjo (withdrawn)
US 10,449,880 B2, 10/2019, Mizobata et al. (withdrawn)
English translation of DE-102013223733-A1, accessed Feb. 24, 2023 via USPTO Search Tool (Year: 2014).*
English translation of FR-2873746-A1, accessed Feb. 24, 2023 via USPTO Search Tool (Year: 2006).*
Joe Clifford, "Toyota MR2: a Midship Runabout 2-seater history," Feb. 25, 2015, p. 12, <https://mag.toyota.co.uk/toyota-mr2-history/> (Year: 2015).*

(56) References Cited

OTHER PUBLICATIONS

International Search Report received for corresponding PCT Application No. PCT/US21/18628 dated May 17, 2021.
Written Opinion of the International Searching Authority received for corresponding PCT Application No. PCT/US21/18628 dated May 17, 2021.
"Our Best Tips to Optimize your Designs for 3D Printer Powder Removal" (Richardot)[online](retrieved from the internet on Apr. 20, 2021)<URL https://www.sculpteo.com/blog/2018/03/26/our-best-tips-to-optimize-your-designs-for-3d-printer-poweder-removal/>, Mar. 26, 2018 (Mar. 26, 2018); entire document, including p. 3 para 2.
Extended European Search Report in EP21756974.8, mailed Feb. 13, 2024, 6 pages.
Office Action received for Japanese Patent Application No. 2022-548747, mailed on Nov. 5, 2024, 21 pages (10 pages of English Translation and 11 pages of Original Document).

\* cited by examiner

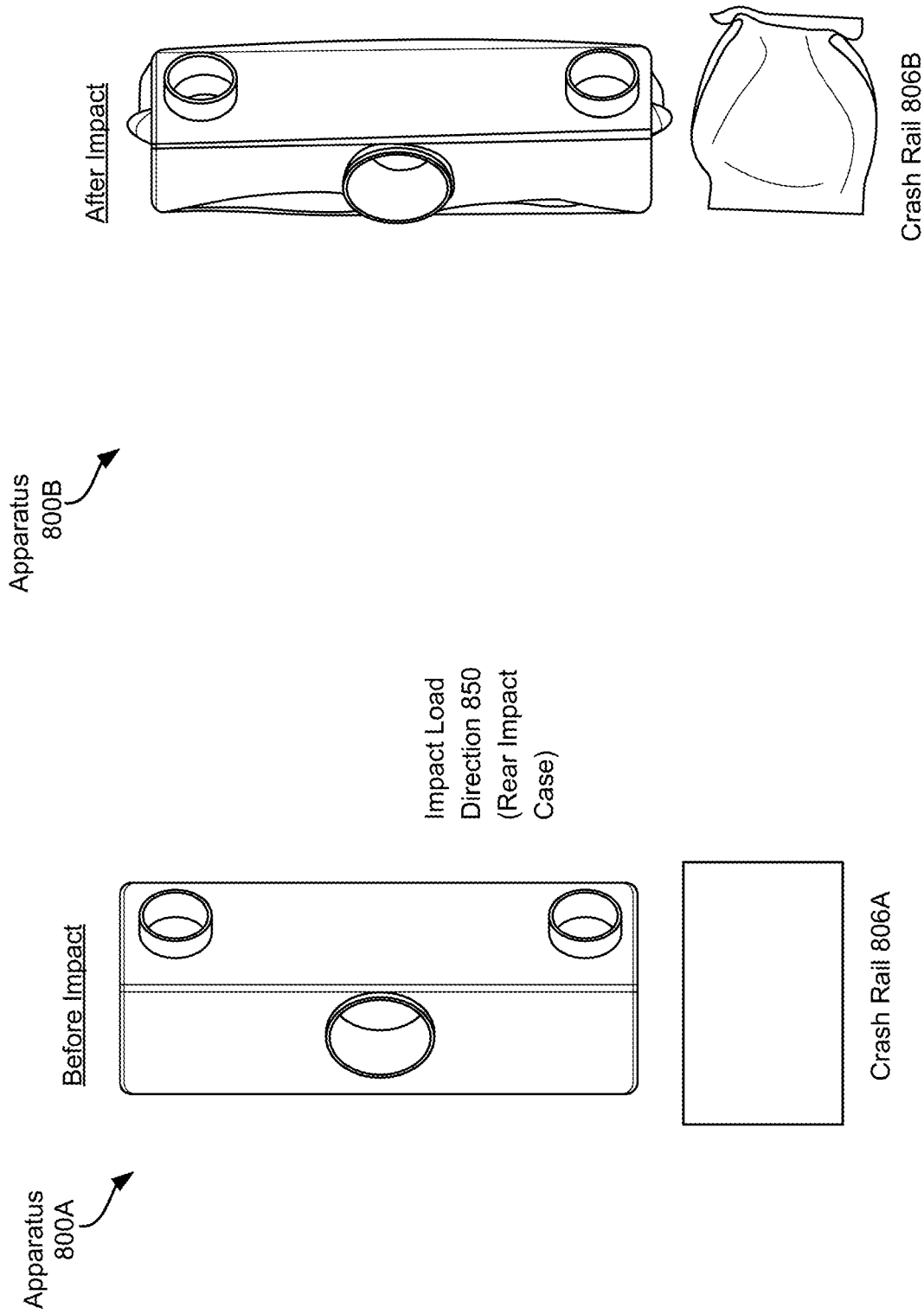

IMPACT ENERGY ABSORBER WITH INTEGRATED ENGINE EXHAUST NOISE MUFFLER

CROSS-REFERENCE TO RELATED APPLICATIONS

This application claims the benefit of, and right of priority to, U.S. Provisional Patent Application No. 62/978,232, entitled "IMPACT ENERGY ABSORBER WITH INTEGRATED ENGINE EXHAUST NOISE MUFFLER," filed on Feb. 18, 2020, the entire contents of which are herein incorporated by reference as if fully set forth herein.

BACKGROUND

Field

The present disclosure relates generally to additively manufactured systems, and more particularly, to multifunction muffler and crash structures in vehicles.

Background

For vehicle manufacturers, fuel economy and performance-related criteria often make it desirable to minimize a vehicle's mass as much as practicable. In many vehicle types, minimizing mass or size, whether generally or with respect to specific components, has inherent benefits. These techniques can also provide other advantages, such as maximizing overall available space for component placement or a passenger cabin. Not surprisingly, finding new ways to minimize vehicle mass and to optimize space for components remains an ongoing engineering challenge. These objectives may persist in part because other manufacturing requirements may, as a practical matter or by necessity, increase the vehicle's form factor, resulting in mass increases. For instance, safety regulations may call for crumple zones in the vehicle that incorporate crash structures for absorbing energy by deforming during impacts. Crash structures add to vehicle size and mass. Together with other well-known fundamental vehicle components, the vehicle mass and size can ultimately add up in a way such that even modest mass reductions to the resulting vehicle, if possible, can be of great value to the manufacturer.

The present disclosure addresses these and other shortcomings in the art.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure is directed to a multifunction apparatus for use in a vehicle that both suppresses engine noise as a muffler, and controllably deforms responsive to an impact as a crash structure. Among numerous other benefits, the multifunction apparatus can help reduce vehicle mass and size while protecting the passengers in a cabin from an impact, as well as reducing the volume of exhaust noise incurred in everyday vehicle operation. While the multifunction apparatus may be positioned in different regions of the automobile, in various embodiments the apparatus includes mounts that enable the apparatus to be arranged between the rear bumper and the engine in the plane of an anticipated rear impact.

In one aspect of the disclosure, a multifunction apparatus for a vehicle includes a muffler. The muffler includes a body having a plurality of walls that bound an array of resonator cells. The resonator cells are arranged between inlet and outlet pipes to suppress exhaust noise. The walls are configured to controllably deform during an impact event.

In another aspect of the disclosure, a multifunction noise suppression and energy absorption structure for a vehicle includes a muffler. The muffler includes a body, an inlet pipe, an outlet pipe, and a plurality of internal walls within the body that bound an array of resonator cells. The internal walls are configured to absorb energy by deforming during an impact.

In still another aspect of the disclosure, a dual function muffler includes a housing, an inlet pipe, an outlet pipe, and a plurality of internal walls defining resonator cells, the internal walls being configured to deform during an impact event.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Various aspects of multifunction noise suppression and crash structures will now be presented in the detailed description by way of example, and not by way of limitation, in the accompanying drawings, wherein:

FIGS. 8A-B are upper views of the multifunction apparatus adjacent a crash rail portion before and after a rear impact event, respectively.

DETAILED DESCRIPTION

Figure 1A:
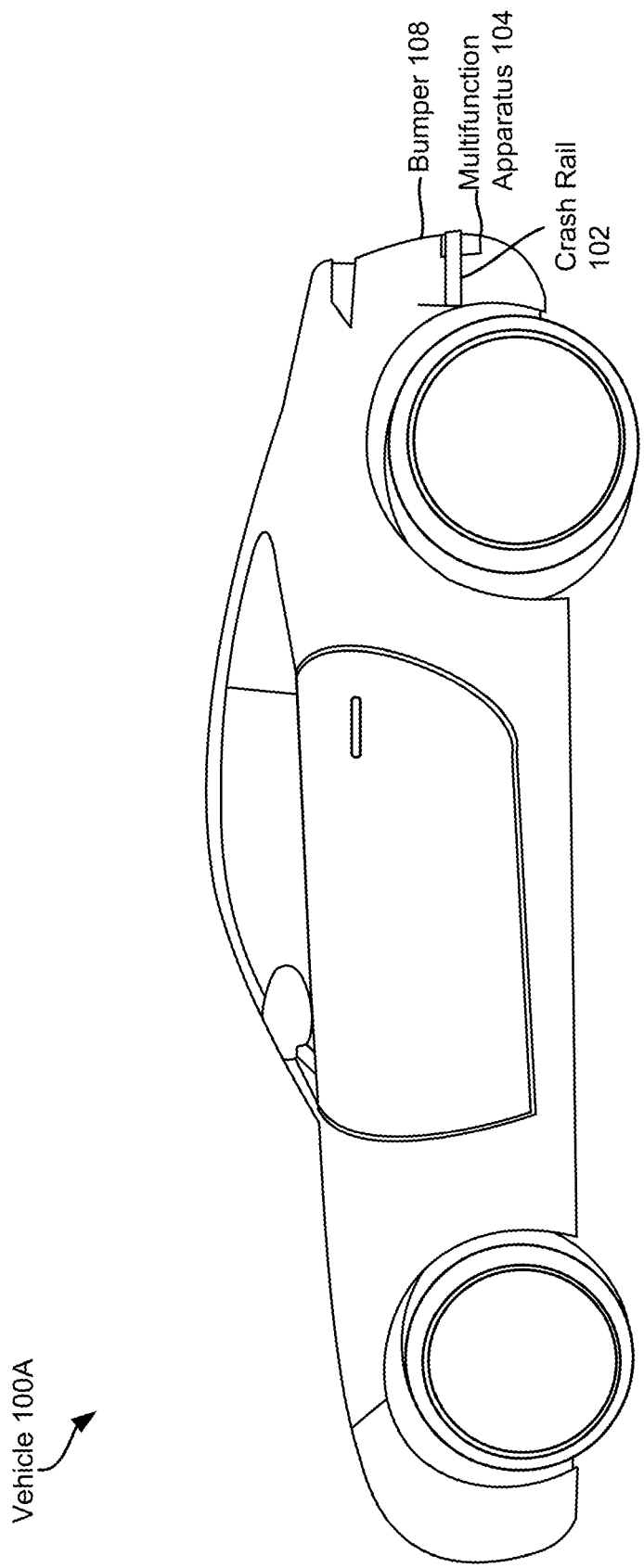
FIG. 1A is a side view of a vehicle showing an exemplary placement of a multifunction apparatus for noise suppression and impact energy absorption.

The detailed description set forth below in connection with the appended drawings is intended to provide a description of various exemplary embodiments of the concepts disclosed herein and is not intended to represent the only embodiments in which the disclosure may be practiced. The terms "exemplary" and "example" used in this disclosure mean "serving as an example, instance, or illustration," and should not be construed as excluding other possible configurations or as preferred or advantageous over other embodiments presented in this disclosure. The detailed description includes specific details for the purpose of providing a thorough and complete disclosure that fully conveys the scope of the concepts to those skilled in the art. However, the disclosure may be practiced without these specific details. In some instances, well-known structures and components may be shown in block diagram form, or omitted entirely, in order to avoid obscuring the various concepts presented throughout this disclosure.

The principles of this disclosure include structures that in various embodiments may be three-dimensionally (3D) printed. The disclosure can, to this end, be applicable to a variety of 3D printing technologies, including but not limited to fused deposition modeling (FDM), digital light processing (DLP), stereolithography/masked stereolithography (SLA, MSLA), powder bed fusion (PBF) printers including selective laser sintering (SLS), direct metal laser sintering (DMLS), selective laser melting (SLM), electron beam melting (EBM), Binder Jetting, Material Jetting (MJ), Drop on Demand (DoD), and others. For purposes of this disclosure, "vehicle" is broadly construed to include automobiles of all types (e.g., cars sedans, sports cars, race cars, sports utility vehicles, convertibles minivans, station wagons, vans, hybrid cars and any type of consumer or commercial automobile available), including also pickup trucks, larger trucks, commercial trucks, and generally any type of consumer or commercial transport structure. Vehicles also include all means of public transport, such as trains, busses, minibuses, subways, and other such transports.

The present disclosure is directed to multifunction apparatuses for use in vehicles. The multifunction apparatus may both perform the vehicular muffler function by suppressing engine noise and may concurrently act as a crash structure by being aligned with predicted impact directions and controllably deforming responsive to an impact event. Conventional mufflers are not designed to controllably deform during an impact, much less assist with passenger protection in the event of a crash. The effect of a conventional muffler on the passenger cabin area during an impact, even if it is positioned within the axis of the impact, would be at most unpredictable given the detailed design considerations that can govern crash structures, which are not factored while designing conventional mufflers. The muffler's effect, if so positioned within the axis of impact, could even be deleterious to the passenger.

It is therefore not surprising that conventional mufflers in cars are ordinarily placed towards the bottom of a vehicle as part of the exhaust manifold, and below the predicted plane of a typical crash or impact event. Hence, these conventional structures are not likely to influence energy absorption characteristics of a passenger cabin resulting from an impact. Further, in normal operation, the muffler is at an elevated temperature due to the exhaust gases passing through it. This results in a debit in mechanical properties and its performance during a crash event, which would be weakened. For these reasons, the muffler is conventionally relegated to performing its dedicated function of suppressing exhaust noise, with separate crash structures present in the zones of likely impact.

Typical mufflers are composed of an array of selectively positioned tubes, channels and holes that are arranged between, and one or more input pipes and one or more output pipes. The input pipes bring exhaust gases from the engine along with the sound waves created from the explosion of gasoline in the car's engine cylinders into the muffler. A muffler uses selectively sized and positioned resonator cells. The resonator cells are associated with a predesigned resonant sound frequency and dampen the specific resonant frequencies of sound waves in the exhaust. Some mufflers may use the resonator cells as echo chambers that receive, combine and cancel out sound waves. A number of resonators within the muffler means that a variety of different resonant frequencies associated with exhaust noise can be dampened. The quantity of damping—that is to say, the amount of noise suppression in decibels—is proportional to the number of the chambers in the muffler. The frequency of damping, which governs the pitch of the noise, is based on the size of these chambers, rather than the number of chambers. By selecting an appropriate range of resonator numbers and sizes, the muffler can drown out loud engine noises.

In contrast to mufflers, crash structures, also called crumple zones or crunch zones, are structural safety features used to absorb sudden bursts of energy during an impact event in order to prevent the brunt of that energy from being transferred to the passenger cabin and causing serious injury or death to the vehicle occupants. Crash structures can be designed to have walls that controllably deform, e.g., responsive to a rear impact. Crash structures may be located at various points in the vehicle, whether by strategy or legal mandate. Strategically placed crash structures can use this controlled deformation to effectively increase the time over which the occupants decelerate (e.g., reducing the "crash pulse" or sudden deceleration of the occupants), which effectively reduces a maximum force applied to the passenger area. The crash structures are intentionally designed to receive damage by crumpling, to protect the vehicle occupants. Crash structures may include box-type or rectangular structures, as well as rail-based structures.

In much the same way as mufflers are not used as crash structures, conventional crash structures are neither used for nor capable of exhaust noise suppression, the latter of which, as indicated, typically uses specially-designed resonator cells arranged within a path of the exhaust gas to suppress undesired vehicle noise. Current vehicles use separate components located in different regions for these two purposes, both of which must be accounted for in considering the overall space and availability of vehicle components.

Another historical obstacle to producing vehicle parts that perform multiple unrelated functions in general is that such composite designs would be intricate and could not practicably be implemented using conventional manufacturing techniques like machining, casting or extrusion. For example, both crash structures and mufflers have specially designed structures for performing their desired purposes. It would be difficult or impossible to use machining and similar techniques to create such a sophisticated geometrical hybrid structure capable of performing these two functions. Exacerbating factors to such an attempted design would be to ensure the end result is oriented in the vehicle the right way to properly receive and eliminate exhaust gases for noise suppression, and that also include materials that would controllably deform from high-energy impacts that occur while the muffler is hot. Current materials used in a muffler, for example, may not controllably deform while at ambient temperatures, much less while at the muffler's very high operating temperature because conventional mufflers are not designed to crumple.

In an aspect of the disclosure, a multifunction apparatus includes a body that can be used for exhaust noise suppression, and that can concurrently be used as a crash structure configured to controllably deform during an impact event. Unlike conventional crash structures, the material used can be lighter, and adjacent crash rails can likewise be made smaller and lighter when the multifunction apparatus is correctly oriented in the plane of impact as described further below. The combination of the muffler with the crash structure reduces the number of components in the vehicle, and as a consequence it can reduce the mass of the vehicle while increasing the available space within the vehicle.

To address any potential challenges in manufacturing such a structure to include the necessary geometrical precision, the multifunction apparatus may in some embodiments be three-dimensional (3D) printed. A computer aided design (CAD) model of the structure can be carefully designed that implements the detail of the muffler and its attendant resonator cells, while simultaneously accommodating the structure necessary to achieve the precise energy absorption characteristics of a controllable deformation that characterizes the crash structure functionality. The model can undergo simulations prior to 3D printing to refine the design. The 3D printed nature of the multifunction apparatus may use a material that controllably deforms when the multifunction apparatus is at low or high operating temperatures. 3D printing, also known as additive manufacturing (AM), can produce structures (referred to as build pieces) with geometrically complex shapes, including some shapes that are difficult or impossible to create by relying on conventional manufacturing processes, such as machining. AM parts can advantageously be printed with diverse geometries and compositions using materials that allow the part to have specifically-tailored properties for a target application. Here, the walls can be designed to not only form resonator cells with the appropriate characteristics, but also can be designed to crumple in a controlled manner when needed as a crash structure.

As noted, being positioned away from the key axes of impact, the conventional muffler may have little, if any, effect on the vehicle's overall crash profile. The multifunction apparatus as described herein, by contrast, may be equipped with mounts that enable it to be uniquely positioned, such as in the rear of a vehicle directly in the plane of a predicted impact. In some examples, the multifunction apparatus can be arranged between the two crash rails in a lateral (side-to-side) direction of the vehicle, while also being arranged between an engine and a rear bumper in a longitudinal (front-to-back) direction of the vehicle. There may be intervening components in some embodiments. The multifunction apparatus may beneficially reduce the size and mass needs of the crash rails when it is so positioned to absorb energy from the impact. This is because the multifunction apparatus can share the impact with the crash rails in the event it occurs.

FIG. 1A is a side view of a vehicle 100A showing an exemplary placement of a multifunction apparatus 104 for noise suppression and impact energy absorption. The side view shows crash rails 102, also known as crush rails or frame rails, on one side of the vehicle in a plane closer to the viewer. In some embodiments, the apparatus 104 may instead be located between an end of the crash rail and a rear bumper 108. Here, the multifunction apparatus 104 is oriented in a rear portion of the vehicle 100A, where it is configured along with the adjacent frame rails 102 to absorb energy due to an impact. At the same time, as described herein, the apparatus 104 is configured to receive exhaust from the nearby engine and to stifle the loud engine frequencies before ejecting the exhaust from one of its outlets.

Figure 1B:
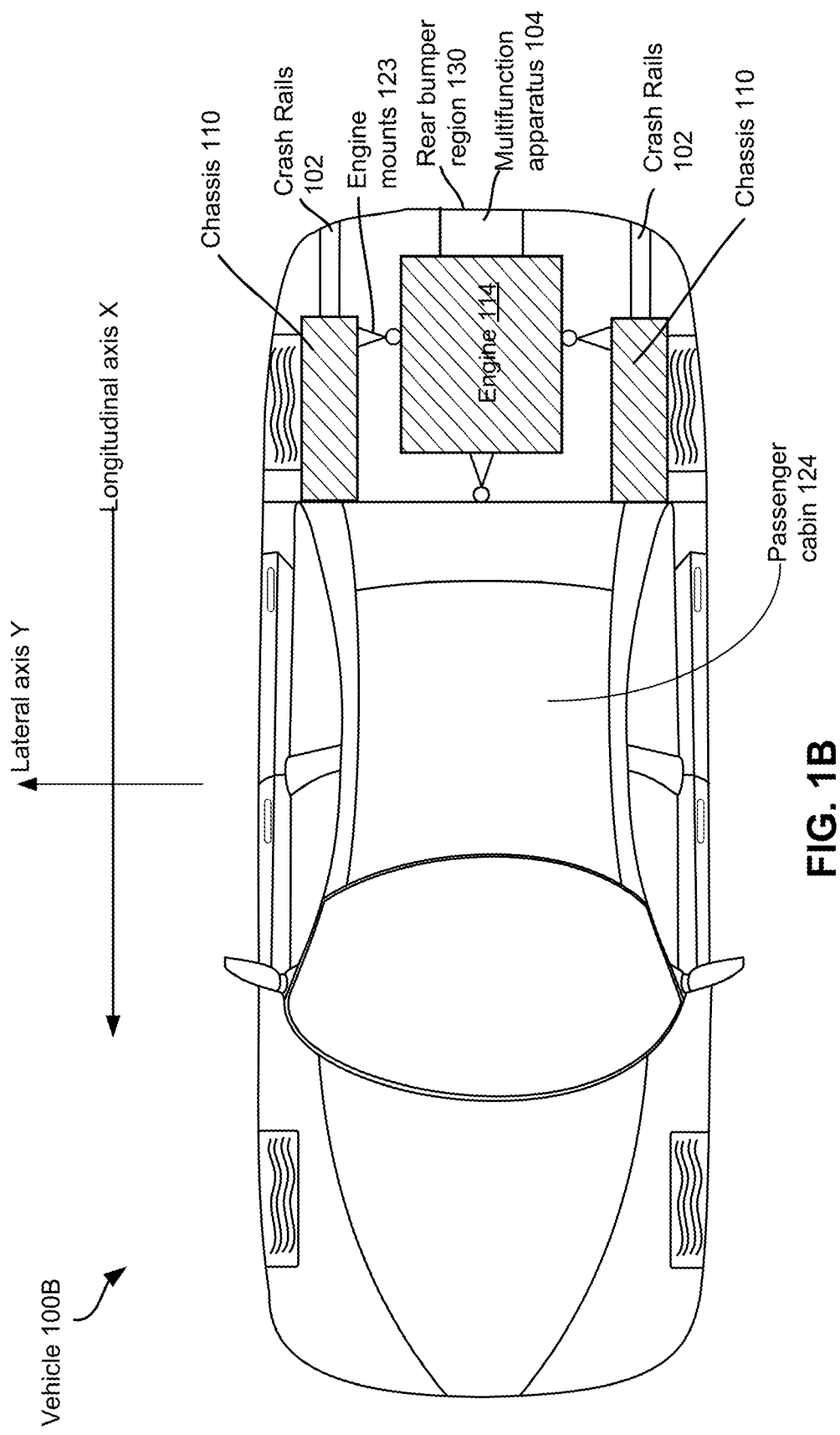
FIG. 1B is a top view of a vehicle showing an exemplary placement of the multifunction apparatus.

FIG. 1B is a top view of a vehicle 100B showing an exemplary placement of the multifunction apparatus 104. The top view shows additional detail. In various embodiments, the engine 114 is mounted via engine mounts 123 along a longitudinal axis X of the vehicle 100B between the passenger cabin 124 at one end, and the rear bumper region 130 at the other end. Between the engine 114 and the rear bumper region 130 along the longitudinal axis X lies multifunction apparatus 104. The crash rails 102 may run along longitudinal axis X on each side of multifunction apparatus 104. The crash rails 102 are coupled to the chassis 110 of the vehicle 100B. Engine 114 is also mounted in the direction of the lateral axis Y along both sides of the chassis 110. Multifunction apparatus 104 is oriented such that it receives the engine exhaust from the engine, and that it outputs the exhaust at the rear of the vehicle 100B. Multifunction apparatus 104 is further oriented such that it lies within the plane of a rear impact.

Figure 1C:
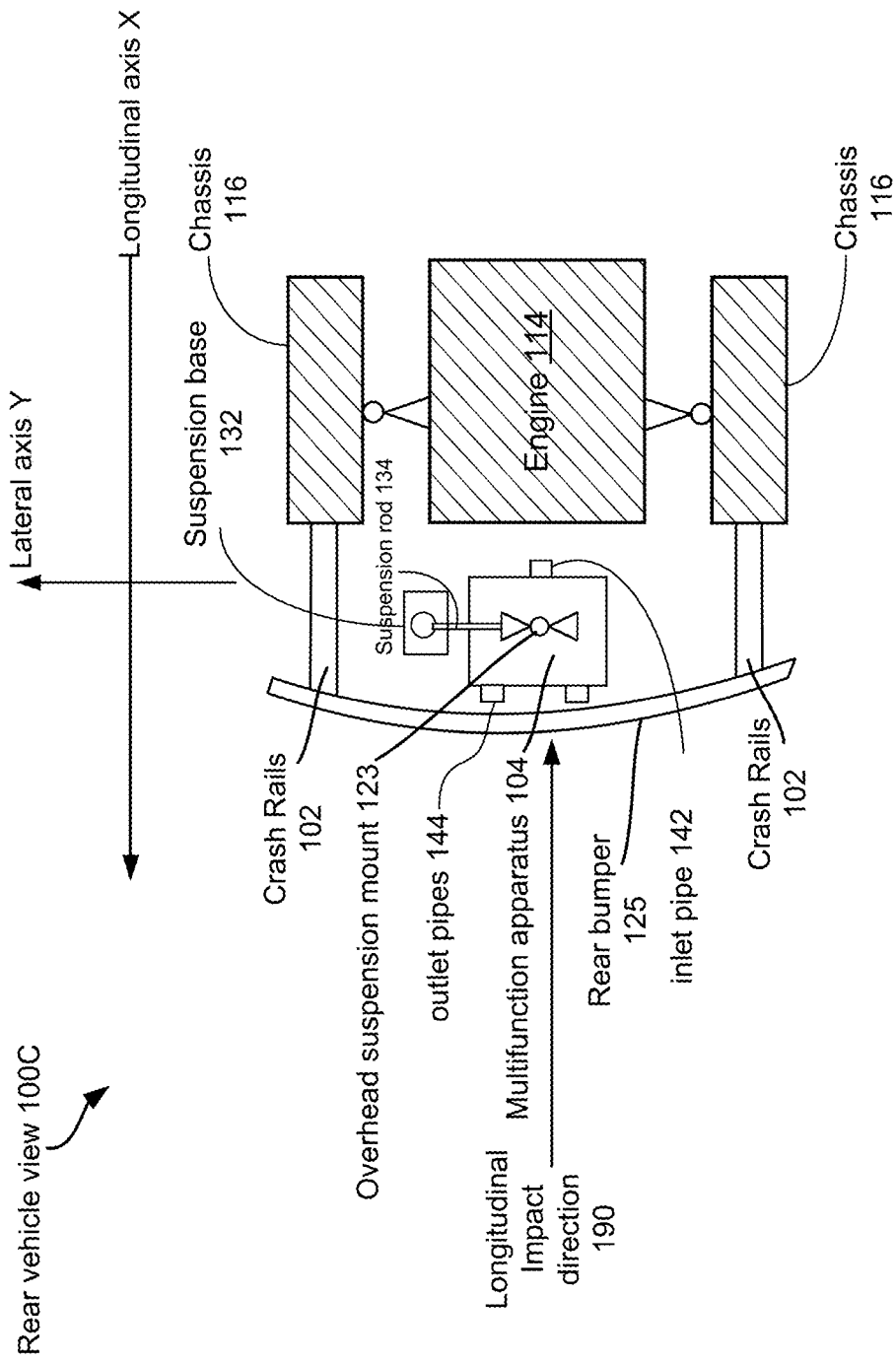
FIG. 1C is a top view showing the placement of components in a rear of the vehicle.

FIG. 1C is a top view showing the placement of components in a rear of the vehicle. In this embodiment, rear bumper 125 is shown as running generally along a direction of the lateral axis Y. As before, the crash rails 102 run on each of the respective lateral sides of the vehicle along longitudinal axis X and are coupled to chassis portions 116. Multifunction apparatus 104 is shown between rear bumper 125 and the engine 114. In various embodiments, multifunction apparatus 104 may be mounted along its lateral sides using mounting fixtures on the sides of apparatus 104. In other embodiments such as shown, multifunction apparatus 104 may include an overhead suspension mount 123. The overhead suspension mount may be used to couple to a rod or other fixed structure in the top rear region of the vehicle 100C, such that multifunction apparatus 104 is positioned to suspend in the vehicle between the crash rails 102 in the lateral direction Y. The multifunction apparatus 104 also includes inlet pipe 142 and outlet pipes 144. Inlet pipe 142 is coupled to an exhaust pipe from the engine. More than one inlet pipe may be used. Output pipes 144 carry the exhaust gases from the engine, in this embodiment, out toward the rear of the vehicle. The inlet pipe 142 or outlet pipes 144 may in various embodiments include a manifold that carries the exhaust gases in a one-to-many or many-to-one fashion, depending on the design of the multifunction apparatus 104, the engine 114, and the exhaust system.

As is evident from FIGS. 1A-1C, in these embodiments the multifunction apparatus 104 is positioned in a plane of a rear impact between the rear bumper 125 on one side, and the engine 114 and further down the passenger cabin, on the other side. In some embodiments, the multifunction apparatus 104 may be closely adjacent, or may even contact, the rear bumper. In some embodiments, the multifunction apparatus 104 may effectively be isolated in space, suspended between the crash rails 102 laterally and between the engine 114 and rear bumper 125 longitudinally. This spatial isolation advantageously keeps the radiation and heat energy of the exhaust away from lower temperature components of the vehicle, minimizing the possibility of damage of components due to thermal exposure. This position is exemplary in nature, and in different embodiments, the multifunction apparatus may be positioned in other impact zones or crumple zones of a vehicle. The embodiments shown in FIGS. 1A-IC are beneficial in that in many jurisdictions, regulatory laws require the presence of an energy absorbing structure in the area shown by the multifunction apparatus 104. Moreover, multifunction apparatus 104 can be used in conjunction with the crash rails to reduce the transfer of energy due to an impact to the passenger cabin 124 (FIG. 1B).

Isolating the multifunction apparatus may also be important because when the apparatus is subject to heating, the apparatus can expand and grow in size by several millimeters due to thermal expansion caused by the hot exhaust gases. The growth can be several millimeters in some embodiments. Inconel and certain other metal allows are good candidate materials for 3D printing the apparatus. Inconel, for example, can withstand temperatures of 1000° Celsius.

As FIG. 1C also demonstrates, the rear bumper 125 is supported by the two crash rails which are coupled to the vehicle's chassis 116. During ordinary vehicle operation, the multifunction apparatus 104 functions as a muffler, receiving exhaust gas via an inlet pipe (the exhaust path is omitted for clarity) from engine 114, suppressing and/or canceling engine noise using resonator cells bounded by inner walls, and allowing the exhaust to be output via pipes 144, which may be coupled to a manifold or other exhaust system for routing the exhaust out of the vehicle.

The multifunction apparatus 104 is composed of one or more materials whose material properties are sufficient to withstand the operating temperature of the vehicle, including the high temperatures of the exhaust gas, while still being about to controllably deform. Accordingly, in various embodiments, the material of the multifunction apparatus is composed of Inconel, titanium, or another material. Using Inconel or a similar metal alloy beneficially allows the apparatus 104 to function properly as a muffler and to correctly crumple in the case of a rear impact-all the while maintaining a relatively low mass. It is noteworthy that most crash tests are performed when the engine is cold, rather than when the vehicle is at its operating temperature (about 800° Celsius at the muffler). The multifunction apparatus 104 can be manufactured to controllably deform during high energy impacts that occur whether the vehicle is still relatively cold or is already at full operating temperature and while the apparatus 104 is receiving hot exhaust gases.

In various embodiments, the multifunction apparatus 104 is 3-D printed, such as by using powder bed fusion (PBF). The print material may be selected to be Inconel, another Nickel alloy, titanium, or a similar material. Desirable features include a reasonably low mass, a high temperature tolerance, and a flexibility that enables it to undergo controlled deformation over a wide operating temperature range. Inconel, for example, is generally functional over more than a 1000° C. range.

During the CAD modeling of the multifunction apparatus 104, the multifunction apparatus 104 including its interior structure (described below) is in various embodiments optimized over two global optima-namely, impact energy and exhaust energy. Thus, one or more optimizing algorithms may be used with the CAD model of apparatus 104 to optimize these two criteria.

Referring still to FIG. 1C, in one embodiment, the multifunction apparatus 104 may be attached to the vehicle by any rigid structure nearby the apparatus 104. The structure may in an embodiment perform a different function, and may also be used to connect to the multifunction apparatus 104 securely, to keep the apparatus in place. For example, the overhead suspension mount 123 may be coupled to a steel or alloy-based suspension rod 134 that has a high heat tolerance. The suspension rod 134, in turn, may be coupled to the rigid structure discussed above, referenced in FIG. 1C as the suspension base 132. The suspension base 132 can be any rigid body capable of connecting to suspension rod 134 to form a secure connection. The suspension base 132 need not be part of the chassis 116 in cases where it is desirable to isolate the apparatus 104 from the chassis 116. In other embodiments, the mounts of the multifunction apparatus 104 are instead arranged on the sides (see FIGS. 2, 3), and the side mounts in those embodiments can each be connected to suspension bases 132 or other structures on both sides to implement a more secure attachment platform. In short, any number of embodiments can be used for effectively securing and mounting the apparatus 104 to securably be suspended in its proper orientation.

Figure 1D:
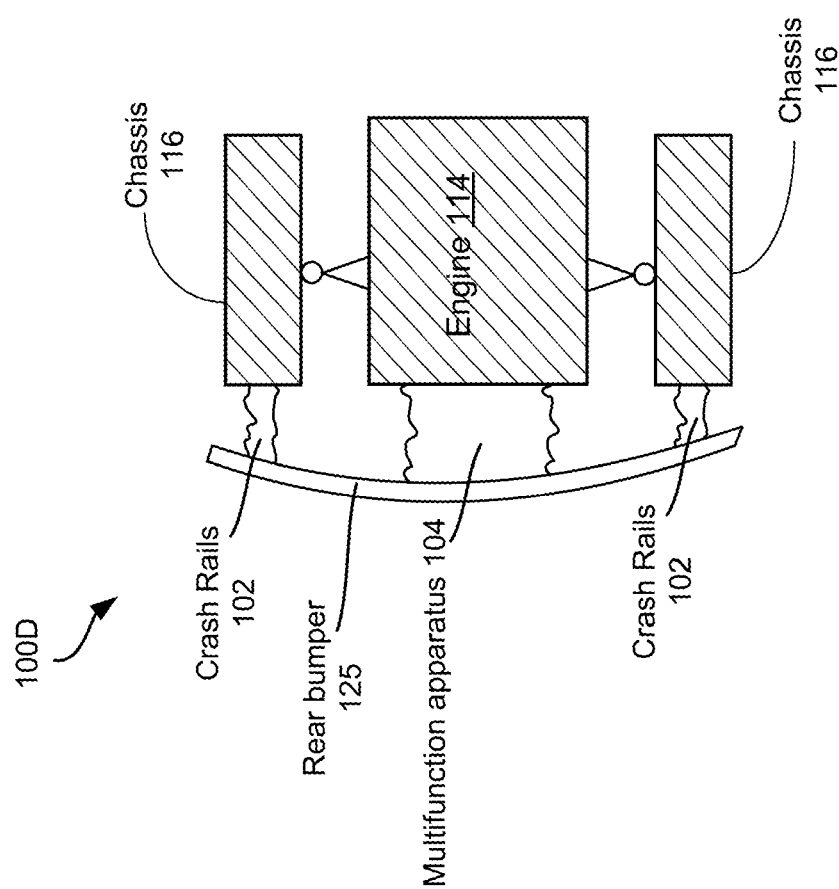
FIG. 1D is a top view showing the placement of components in a rear of the vehicle following an impact event.

FIG. 1D is a top view showing the placement of components in a rear section 100D of the vehicle following an impact event. When the rear bumper 125 is deflected by a sufficient amount, such as by a rear collision, the multifunction apparatus 104 and the crash rails 102 deform in the longitudinal direction as defined above. In various arrangements, the multifunction apparatus can be made out of a strong enough material like Inconel, such that the crash rails 102 can be made thinner and shorter. This beneficially reduces the overall vehicle mass. In embodiments where the multifunction apparatus is placed at the rear of the vehicle, the apparatus can assist the crash rails 102 such that the load of an impact may be spread across the different components. For example, in various embodiments the multifunction apparatus 104 can be designed such it can absorb 60-75% of the impact energy, and the crash rails 102 only need to each absorb about one-half of the remaining 25-40%. Thus the multifunction apparatus 104 can accord additional benefits to the vehicle by allowing the length and width of the crash rails 102 to be reduced. This in turn allows the overall mass of the vehicle to be reduced.

Another reason that the multifunction apparatus 104 is optimally positioned in the embodiments shown is that, in general, the engine 114 and the transmission to which it is coupled (not shown) are generally too stiff to act as crash structures. The engine and transmission therefore do not properly deform or crush during an impact. For this reason, it would be undesirable for the engine 114 to simply be positioned in front of the rear bumper 125, because a strong impact could cause the engine to act as a projectile toward the passenger cabin. Instead, positioning the multifunction apparatus 104 between the rear bumper 125 and the engine 114 allows the "crumple-zone" to be longitudinally behind the engine and transmission. The multifunction apparatus 104 can then be configured to protect the engine, and more importantly the passenger cabin, from receiving the brunt of the energy impact.

Figure 2:
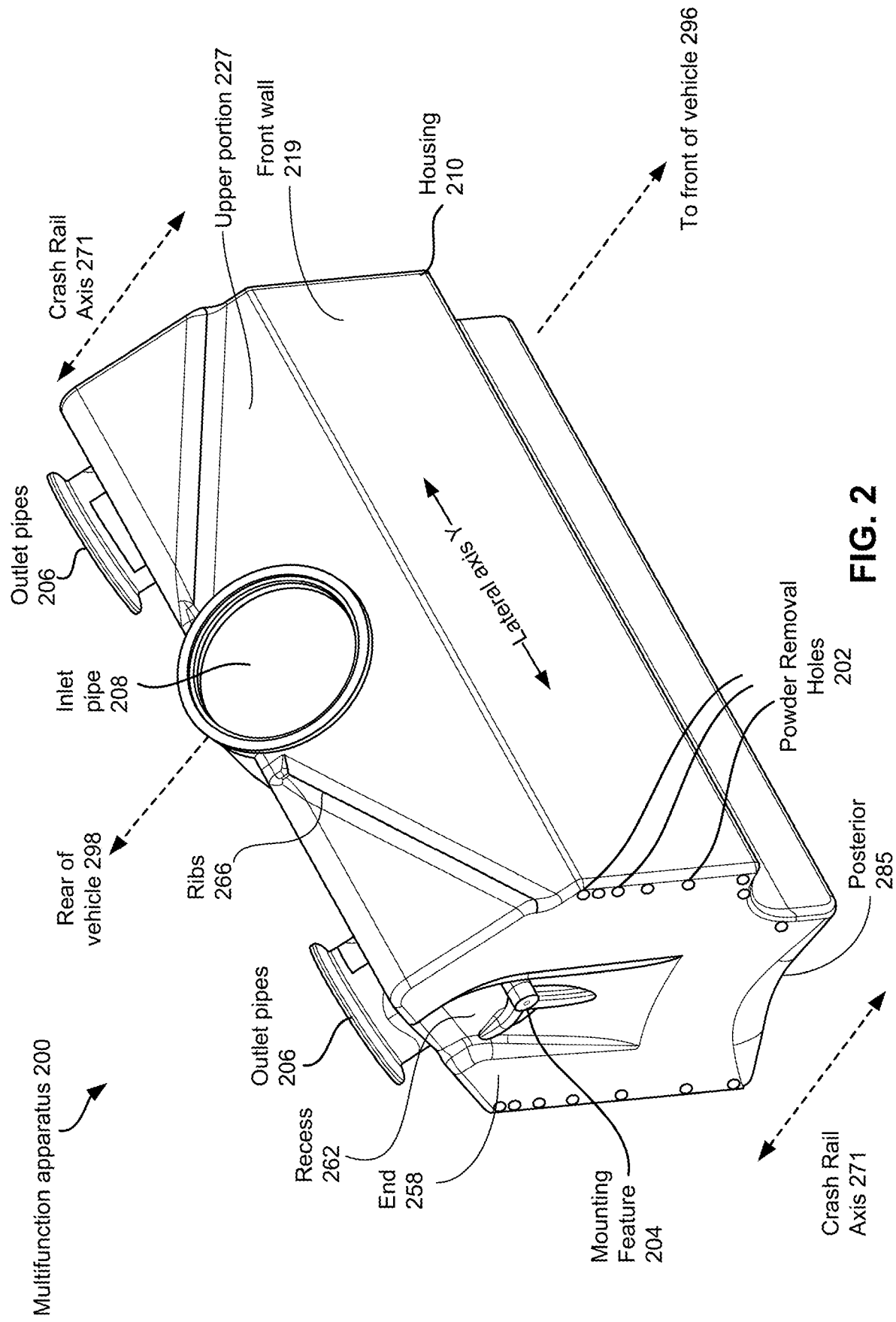
FIG. 2 is a front perspective view of a multifunction apparatus for exhaust noise suppression and energy absorption.

FIG. 2 is a front perspective view of multifunction apparatus 200 for exhaust noise suppression and energy absorption. As clarified by the "lateral axis y" designation on a surface of the apparatus 200, the longer side of the apparatus 200 may be positioned such that the apparatus 200 is "sandwiched" between the rear bumper 125 and engine 114 (as in FIGS. 1A-D). As noted above, the multifunction apparatus 200 may be configured to be positioned in a different location and direction within the vehicle in other embodiments, such as another location with crumple zone requirements, provided only that the apparatus 200 has reasonable access to the exhaust path. In cases where the multifunction apparatus 200 is 3D printed, the 3D printing of the apparatus 200 makes it possible to add intricate geometries around and within the structure without the expensive and labor-intensive limitations associated with more conventional subtractive manufacturing techniques, like machining or extruding.

In addition, in various embodiments, the multifunction apparatus includes a plurality of powder removal holes 202. Powder removal holes 202 may have been 3D printed along with the original multifunction apparatus 200. After the 3D printing, in various types of such printing including powder bed fusion, there will likely remain loose powder in hollow chambers of the apparatus 200. The powder removal holes 202 are configured to enable the manufacturer to remove (via suction or otherwise) loose powder from inside the multifunction apparatus 200. One or more powder removal holes 202 can be made available for each chamber of the apparatus 200 that may include residual powder. After this residual powder is vacuumed out or otherwise removed, the powder removal holes 202 can thereafter be welded shut or otherwise sealed via an appropriate adhesive or other means.

Referring still to FIG. 2, the multifunction apparatus 200 may include an outer housing 210 which surrounds a large portion of the multifunction apparatus 200. The housing 210 may be made thicker or may include additional walls (see below) to protect the multifunction apparatus 200 and to help contain exhaust heat and noise within the multifunction apparatus 200. Apparatus 200 includes a front wall 219 which may face generally toward the vehicle front. The vertical positioning of apparatus 200 may depend in part on the predicted direction or identified plane(s) of maximum force due to a rear impact. The front wall 219 may face the engine.

Multifunction apparatus 200 further includes ends 258 that can be aligned along the crash rail axis 271, although apparatus 200 need not actually contact the crash rail. As shown in these embodiments, each end 258 may include a recess 262, within which a mounting feature 204 can be incorporated to mount the apparatus 200 on a stable structure within the vehicle. Thus, unlike the embodiment reference in FIG. 1C with the suspension mount positioned on a top of the multifunction apparatus 200, the mounting features 204 in these embodiments can additionally or alternatively be included on the ends 258 in order to fix the apparatus 200 sufficiently in place. As noted above, in some embodiments it is desirable to isolate the multifunction apparatus 200 from the chassis at least in part, to thereby prevent all of the received forces from an impact to be transferred to the chassis. Thus, in various embodiments, the apparatus may be mounted on fixtures, rods or other structures that may be independent of the chassis.

With continued reference to FIG. 2, the front wall 219 may face toward a front of the vehicle 296, with the apparatus 200 adjacent a rear portion of the engine. An exhaust pipe or manifold (not shown) may be used to securely couple the exhaust output at the engine, as in a traditional muffler, to inlet pipe(s) 208. In some embodiments, the exhaust pipe may be welded to inlet pipe 208. In other embodiments, an adhesive that is designed to withstand high temperatures may be used to connect the pipes. In still other embodiments, any number of types of mechanical fasteners (screws, nuts, bolts, etc.), may be used to implement the connection.

Towards the rear of the vehicle 298, two outlet pipes 206 can be seen that complement the inlet pipe 208 on the "roof-like" upper portion 227 of the multifunction apparatus 200. An additional set of exhaust pipes (not shown) can be secured to the outlet pipes 206 in the same way as the inlet pipe 208 is secured to its counterpart component. The outlet pipes 206, advantageously facing the rear of the vehicle in this embodiment, may easily route the residual noise-suppressed exhaust out the back of the vehicle.

Other embodiments such as trucks, trains, and larger-scale transport vehicles may use positioning techniques for the multifunction apparatus that are different from above and that are ideal for those larger vehicles, all without departing from the spirit and scope of the teachings herein.

Referring still to FIG. 2, the upper portion 227 may show reinforcing ribs 266, which may be extensions of inner walls of the apparatus 200.

In general, for an apparatus 200 to be useful as a crash structure, it should include structures that are designed to crumple in a controlled manner responsive to the crash, to absorb the received kinetic energy. For successful absorption of energy, the impacting structure must be capable of doing "work" on the crash structure, which is the product of force and distance along the direction of the impact. For these reasons, structures which run perpendicular to the direction of the impact (e.g., a rear-facing collision), such as front wall 219 of apparatus 200, are generally of little if any benefit in a crash, since front wall 219 is positioned to be perpendicular to a longitudinal impact direction 190 (FIG. 1C), and therefore the front wall provides no distance for the received force to penetrate. Thus the momentum simply continues forward in the direction 190. For the same reasons, however, it is also true that the external ends 258, the posterior 285, and the upper portion 227 of the multifunction apparatus 200 (FIG. 2) can be configured to contribute positively to the overall controlled deformation responsive to a rear impact event, because each of these external structures have directional components along the direction 190 of the rear impact. Therefore, they can all absorb various amounts of the kinetic energy from the impact, effectively reducing the forward momentum towards the passenger cabin. As described below, however, the internal regions of the multifunction apparatus 200 are designed to provide most of the protection responsive to the rear impacts.

It should be noted for completeness that, while the direction of the crash can be statistically predicted with confidence, it is not known in all instances with certainty. For example, because the actual direction of an impact may not always be directly from the rear, the level of protection that the various portions of multifunction apparatus can provide will vary in some situations. For example, a side (lateral impact) on the vehicle may make perpendicularly-configured front wall 219 as well as upper portion 227 crumple and thus may absorb energy, meaning that front wall 219 and upper portion 227 would be important in that case, whereas in the same case the ends 258 and other portions do little if anything to stifle the side impact. However, there are often additional or different crumple zones on a vehicle that are designed to accommodate impacts in different directions, including from the front and side of the vehicle (along with other safety measures such as airbags, seatbelts, etc.) for protecting the passengers.

Figure 3:
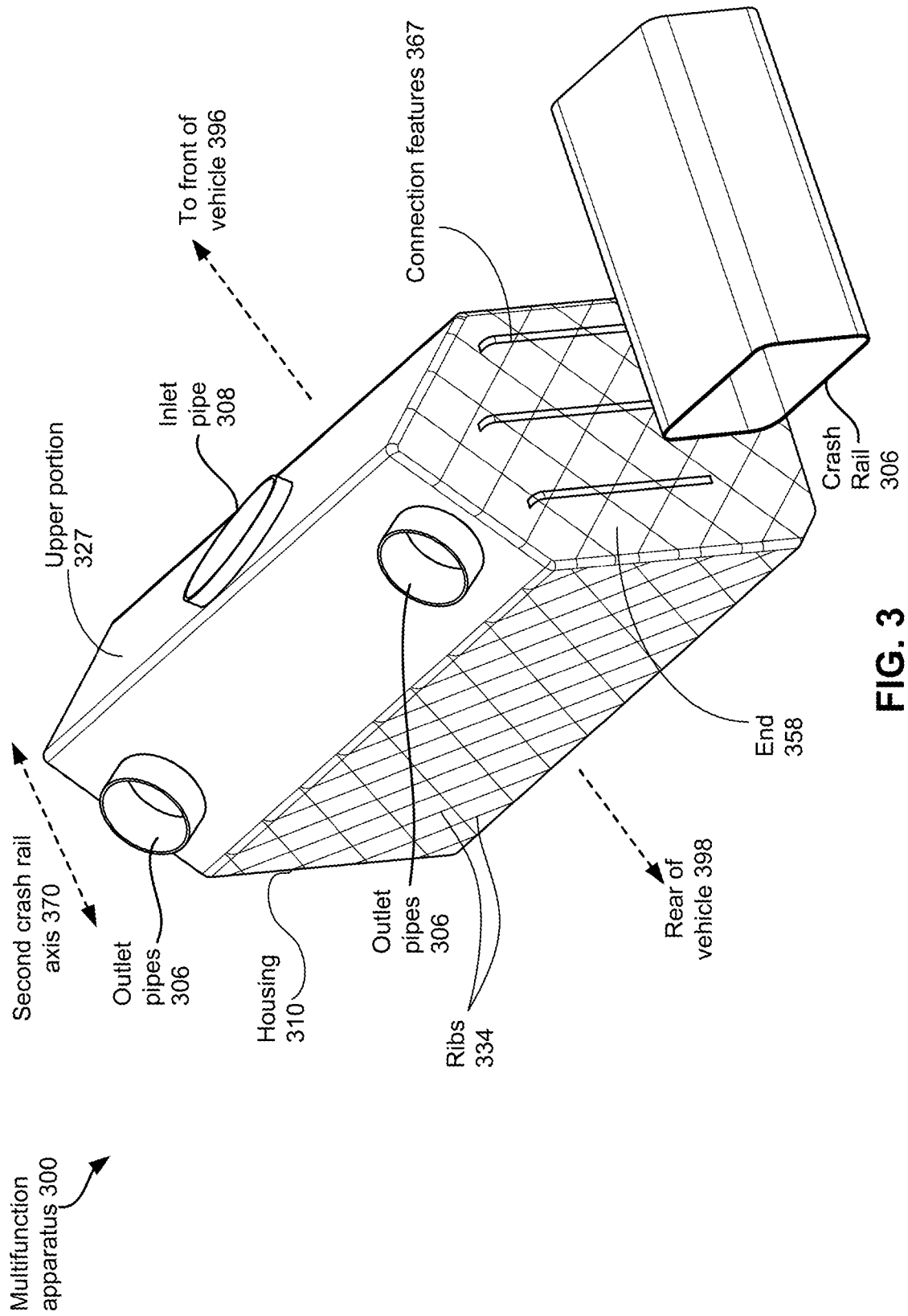
FIG. 3 is a side perspective view of the multifunction apparatus adjacent a crash rail.

FIG. 3 is a side perspective view of the multifunction apparatus 300 adjacent a crash rail. It will be appreciated that only a portion of one of the crash rails 306 is made visible in this view to avoid unduly obscuring the concepts in the illustration. A second crash rail direction 370 is shown on the other side of the apparatus 300. Multifunction apparatus 300 may include, like prior embodiments, an inlet pipe 308 and a pair of outlet pipes 306, although this configuration is exemplary and a different number and position of inlet or outlet pipes are possible. In this embodiment, each end 358 includes a plurality of connection features 367. Connection features 367 may be used to suspend the multifunction apparatus 300 or otherwise secure the position of the multifunction apparatus 300 within a plane of impact, e.g., adjacent a rear bumper. The inlet pipe 308 also faces toward the front of the vehicle 396, which makes routing the engine exhaust to the inlet straightforward. The outlet pipes 306 are on the opposite surface of the upper portion 327 and may point towards the rear of the vehicle 398. The embodiment shown also includes diagonally-spaced lines on the surface of housing 310. The diagonally-spaced lines may be ribs 334. The ribs 334 may in some embodiments correspond to extension of internal walls used for both energy absorption and noise suppression purposes. In other embodiments, the ribs 334 may simply be part of a reinforcement layer of the housing 310.

Figure 4:
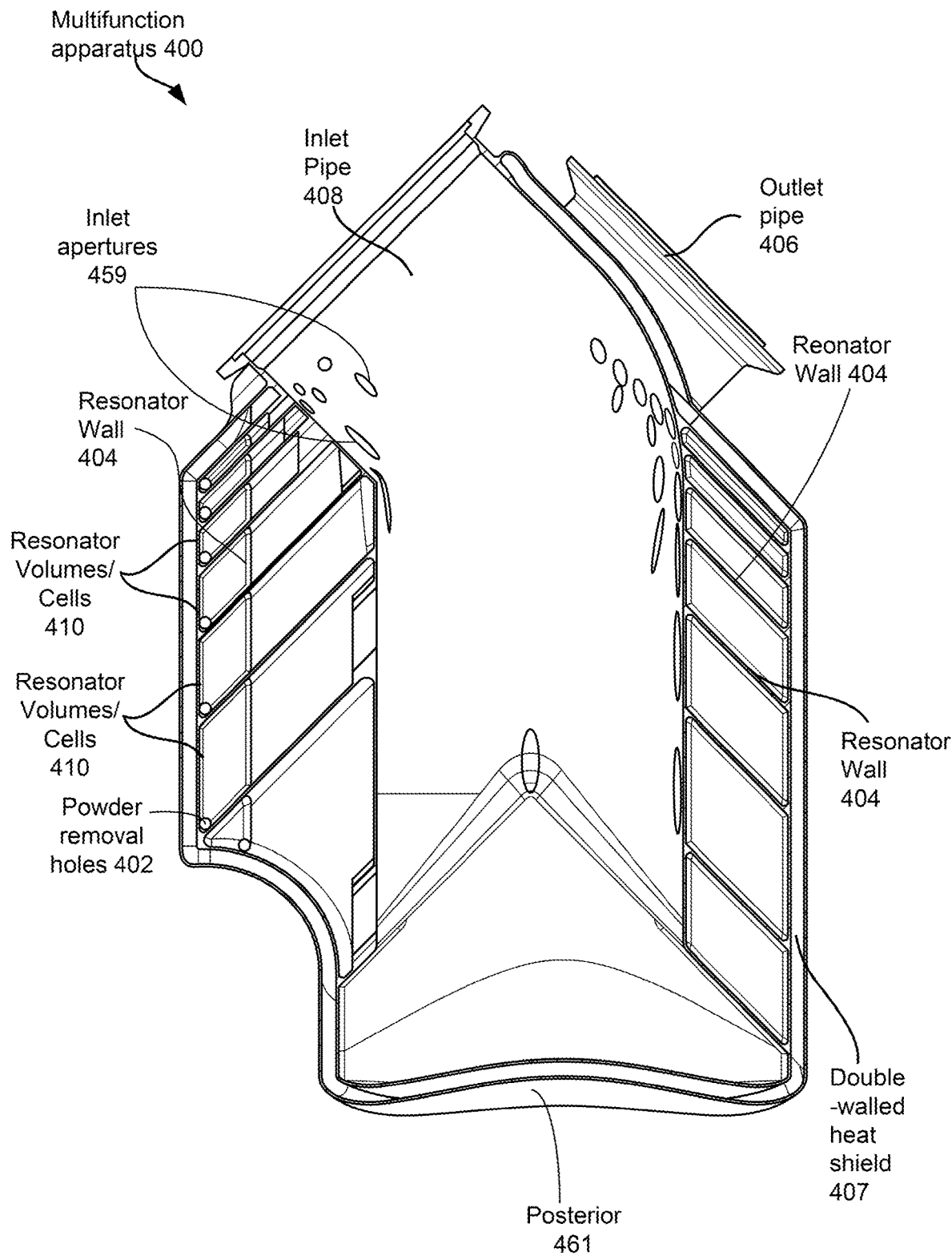
FIG. 4 is a cross-sectional view of the multifunction apparatus showing resonator volumes around inlet exhaust pipe in more detail.

FIG. 4 is a cross-sectional view of the multifunction apparatus 400 showing resonator volumes 410 around inlet exhaust pipe 408. FIG. 4 shows, for example, a portion of the outer wall removed to reveal the resonator cells 410 and a double-walled heat shield 407. In various embodiments, the outer wall of the double-walled heat shield 407 is configured to extend over and conform to the outer surface of the inner wall, offset only by an air gap. The double-walled heat shield 407 acts as a thermal radiation shield to help protect external components from the high exhaust temperatures. In various embodiments, an air gap may be included between the two outer walls. The air gap may serve as a thermal insulator. To protect the entire apparatus from radiating too much heat, the double-walled heat shield 407 with the air gap may extend around most or all of the surface of the multifunction apparatus 400. The double-walled heat shield can isolate the other components from thermal radiation. This protection may be particularly important in vehicles that use components that are connected by adhesives. In these cases, it is important to protect the low temperature structures from becoming thermally stressed by heat from the multifunction apparatus 400, which may also tend to soften nearby adhesives. In various embodiments, the air gap may be vented near the exhaust output to remove the excess heat. For example, in various embodiments, the air gap may include its own input and output ports to receive air and to carry thermal radiation away. FIG. 4 also shows a plurality of resonator walls 404 that are positioned along opposite sides of the structure. The vertically-aligned resonator walls 404 in this embodiment are not exactly aligned with the direction of a rear impact: rather, they are aligned at about 45° from the impact direction. The deviation from perfect alignment may be an engineering choice based on the dual requirements of the resonator walls 404 to crumple in response to an impact and to establish accurate resonator cells 410. That is, the resonator walls 404 may have a dual function. A first function is to bound resonator volumes 410 along with other resonator walls 404 oriented in a different way. The resonator volumes 410 are also referred to herein as resonator cells. The resonator cells 410 are sized and shaped to dampen a particular frequency of sound waves as it enters the cell 410. The resonator cells 410 may also be configured to receive, combine and cancel sound waves of a particular frequency. A second function of the resonator walls 404 is to controllably deform as a result of an impact. There are a number of resonator walls 404, both horizontally and vertically disposed.

For example, as shown on the left side of FIG. 4, the horizontal and vertical resonator walls 404 jutting out from the body of the apparatus 400 also form the resonator cells 410, which may be of different size and shape to dampen different resonant frequencies of engine noise. In various embodiments, most if not all of the internal resonator walls 404 have at least some directional component along the impact axis, and are therefore used as part of a crash structure as needed. The inlet exhaust air may enter the different resonator cells 410 by means of one or more inlet apertures 459, which can be holes in portions of the inlet pipe 404 that enable exhaust gases to enter corresponding resonator cells 410. The resonator cells dampen the engine noise as a result. The outer wall or portion of the housing that was removed to show the cross sectional view of FIG. 4 may also intersect with the outcropping resonator walls to form additional resonator cells 410 adjacent the surface of the apparatus 400. That is, the inner walls 404 may be connected to the outer walls 407 to form additional cells 410 near the surface. The dampened exhaust that flows through the cells is routed out of the apparatus 400 via the outlet pipe(s) 406.

In FIG. 4 it can be seen that each of the horizontal and vertical resonator walls 404 of the apparatus 400 have a directional component that is aligned with a predicted axis of rear impact. For example, the resonator walls 404 on the right are aligned, albeit at a slight incline, to the axis of the impact. As a result, each of the resonator walls 404 can be carefully designed with features including a desired thickness to controllably crumple with desired properties when an impact event occurs. Using CAD modeling and suitable optimization software, along with the precision of 3D printing, the resonator walls 404 can be modeled to both provide resonator cells 410 for muffling exhaust noise and for incorporating the necessary crumpling properties of a crash structure. In addition, the inlet and outlet pipes 408 and 406, as well as portions of the double-walled heat shield 407 have certain directional components that align at least in part with the axis of impact. Thus in some embodiments, the pipes 408, 406 and external walls of the heat shield 407 can be modeled during the CAD process to contribute to the overall effectiveness of the crash structure.

Figure 5:
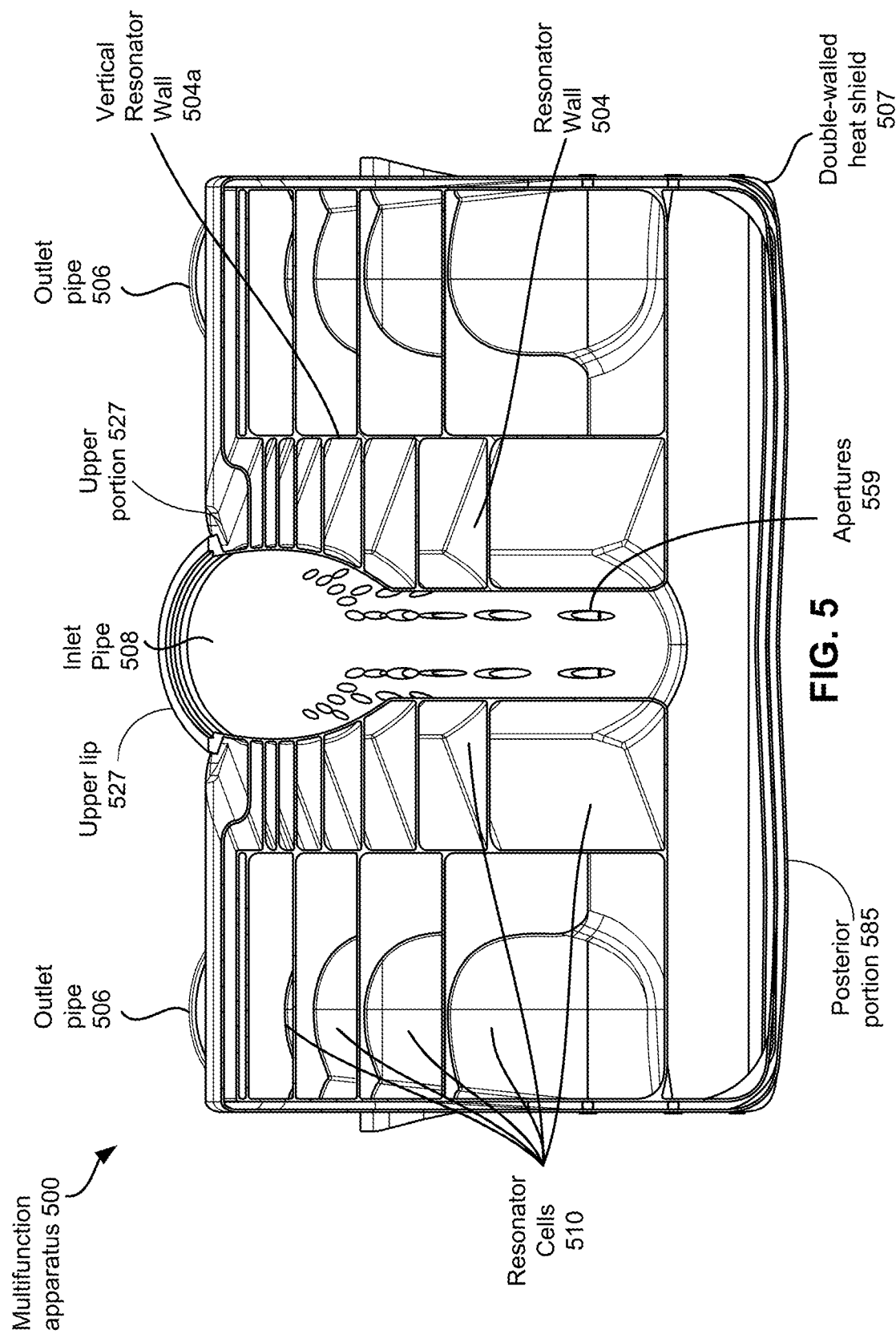
FIG. 5 is a posterior cross-sectional view of the multifunction apparatus showing an interior portion of the inlet pipe and the inner walls that bound the resonator cells.

FIG. 5 is a cross-sectional view of the front of the multifunction apparatus showing the inner walls that bound the resonator volumes. FIG. 5 can be viewed as a portion of the multifunction apparatus 500 that is vertically cut from the top down on the front side along a portion of the inlet pipe 508 such an inner portion of the inlet pipe 508 is visible, the outer portion of the inlet pipe 508 being near the upper portion 527 of the apparatus 500. In the illustrated point of view, the upper lip 527 of the inlet pipe 508 is curved inward, under the plane of the drawing, thus exposing the inner surface of inlet pipe 508 rather than its outer surface. Also, in this view, the density of concentration of resonator walls 504 is shown to increase beginning from the posterior portion 585 of the apparatus 500 and moving vertically up to the upper portion 527. That is, the resonator walls 504 get progressively closer together moving from the bottom to the top of the apparatus 500. A cross-section of the double-walled heat shield 507 is also seen around the perimeter of the multifunction apparatus 500. A number of apertures are shown which allow the exhaust gases from the inlet pipe 508 to flow through the different resonator cells 510, and ultimately to flow out of the outlet pipes 506.

As discussed with reference to FIG. 4, the resonator walls 504 may be carefully designed to bound resonator volumes or cells 510 for damping the desired frequencies. In addition, the horizontally-disposed resonator walls 504 in this embodiment are aligned closely with a parallel direction of a rear impact. Some vertical resonator walls such as 504a are angled inward, and thus appear to have an incline up to about 45° from the direction of impact.

In various embodiments, the multifunction apparatus 500 is vertically positioned with the predicted axis of impact such that the denser concentration portion of horizontally disposed resonator walls 504 (i.e., the denser horizontal walls 504 vertically closer to the upper portion 527) are aligned directly with the axis of the impact, whereas the less dense concentrations of resonator walls 504 closer to the posterior portion 585, while also aligned with the axis of impact, are more offset from the predicted direction than are the denser portion of resonator walls 504. That way the densest concentration of resonator walls 504 are most closely aligned with the rear axis of impact, making the crash structure more effective in a correctly predicted impact event since the densest concentration of walls 504 can be used to absorb the crash energy more effectively.

The combination of functions in one apparatus 500, e.g., multifunction apparatus, beneficially removes the necessity for both structures, and as such removes mass that would otherwise be present in the vehicle.

Figure 6:
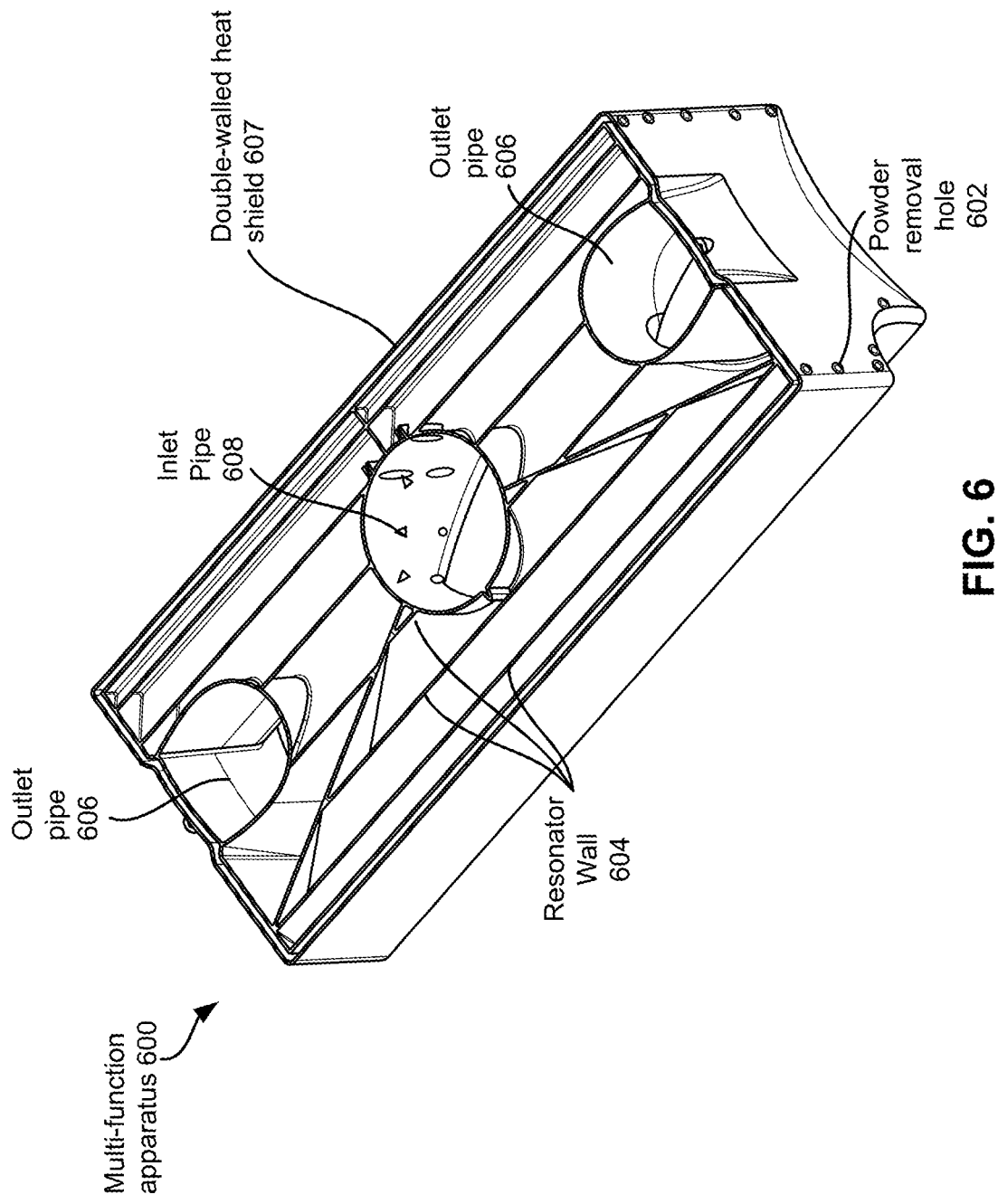
FIG. 6 is an upper cross-sectional view of the multifunction apparatus showing inclined resonator walls for energy absorption.

FIG. 6 is an upper cross-sectional view of the multifunction apparatus 600. FIG. 6 shows the top portion of the apparatus with the upper portion removed to expose the resonator walls 604. In this embodiment, the resonator walls 604 may be inclined up to about 45° from the direction of impact. In embodiments where the multifunction apparatus is 3D-printed, the resonator walls 604 may be oriented such that they do not require any support structures while being 3D-printed. This may be achieved by factoring in the 3D-print vector (i.e., the vector that represents the orientation of the part with respect to the print bed) while designing the multifunction apparatus. Cut-off sections of inlet pipe 608 as well as outlet pipes 606 are visible. Double-walled heat shield 607 is also shown surrounding the perimeter of apparatus 600. While the double-walled heat shield 607 can act to prevent damaging heat flow to external components, the double-walled heat shield 607 may also be useful to dampen noise from the exhaust as the gases move through the resonator cells. Powder removal holes 602 may enable the manufacturer to remove loose powder particles immediately after the print job.

Figure 7B:
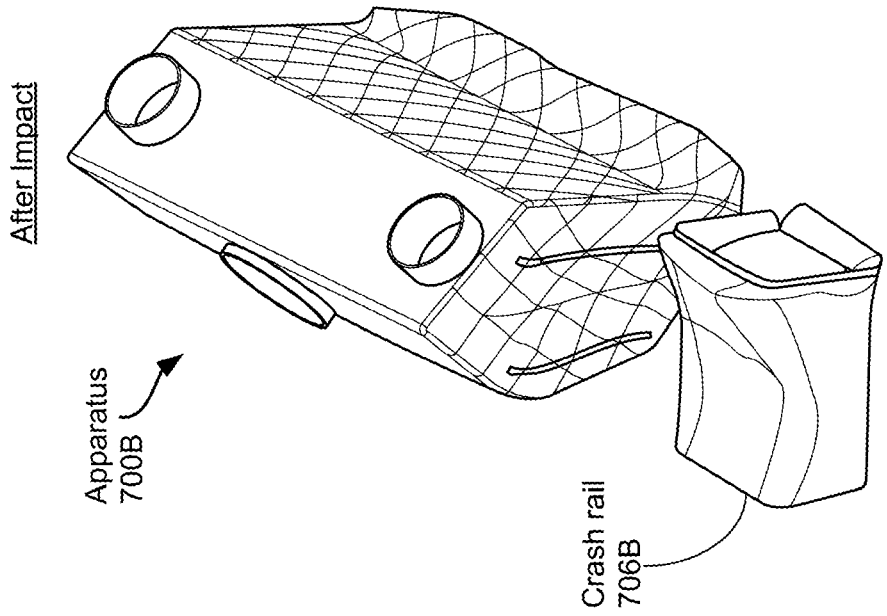
FIGS. 7A-B are side perspective views of the multifunction apparatus adjacent a portion of a crash rail before and after an impact event, respectively.
Figure 7A:
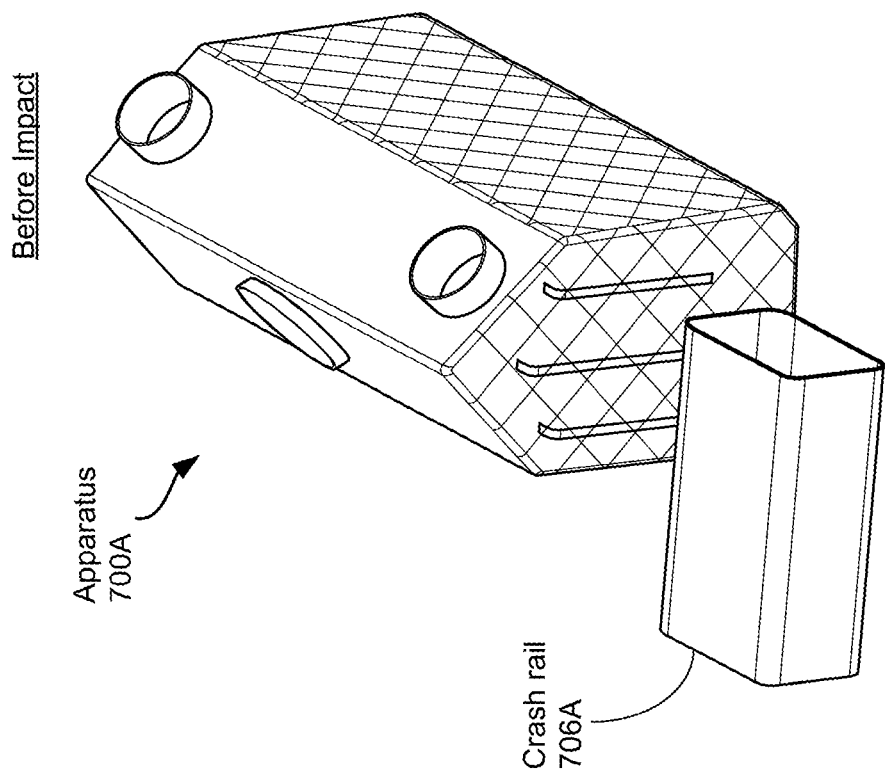

FIGS. 7A-B are side perspective views of the multifunction apparatus adjacent a portion of a crash rail before and after an impact event, respectively. FIG. 7A shows apparatus 700A as it would be generally aligned with a portion of crash rail 706A. For clarity, the other details in this embodiment, such as the mounting of the apparatus and the remaining portions of the exhaust system, are omitted for clarity.

Following a rear impact event, the apparatus 700B is sown along with the crash rail 706B to be controllably deformed. The severity of the impact will likely be proportional to the amount of deformation. The passenger cabin and even the engine and transmission have likely missed a significant amount of the impact force, which was absorbed in the apparatus 700B and the crash rail portion 706B.

FIGS. 8A-B are upper views of the multifunction apparatus adjacent a crash rail portion before and after a rear impact event, respectively. In this embodiment, the multifunction apparatus 800A is positioned to receive a rear impact, although other embodiments (e.g., a front vehicle crash structure) are also possible. As per earlier embodiments, the impact load direction 850 is shown to be on the right side of the apparatus 800A. FIGS. 8A-B therefore show a similar view as FIGS. 7A-B but this time from the top. In the rear impact case, apparatus 800A is generally aligned as shown with a pair of crash rails, here again with only a portion of one crash rail 806A being shown for illustrative purposes. Following the crash event, apparatus 800B is deformed as is crash rail 806B, with an amount of damages and a set of consequences similar to those of FIGS. 7A-B.

The previous description is provided to enable any person skilled in the art to practice the various aspects described herein. Various modifications to these exemplary embodiments presented throughout this disclosure will be readily apparent to those skilled in the art. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A multifunction apparatus for a vehicle, comprising:
a muffler including a body having a plurality of walls that bound an array of resonator cells, the resonator cells arranged between inlet and outlet pipes to suppress exhaust noise;
wherein the walls are configured to controllably deform during an impact event,
wherein the walls include a posterior wall located at the bottom of the muffler, and the resonator cells are concentrated more densely the further their distance from the posterior wall,
wherein a length of at least one of the walls is aligned within an angle of 0° to 45° (degrees) from a direction parallel to a predicted direction of the impact event,
wherein the body comprises lateral sides with a longitudinal axis between the lateral sides, and
wherein an outlet pipe opening is on an upper portion of the muffler and between the lateral sides.

2. The apparatus of claim 1, wherein the muffler comprises Inconel or titanium.

3. The apparatus of claim 1, wherein the muffler comprises a material configured to controllably deform at a temperature of at least 800 degrees Celsius.

4. The apparatus of claim 1, wherein the muffler is 3D printed.

5. The apparatus of claim 4, wherein the muffler comprises a plurality of powder holes to enable removal of loose powder from within hollow portions of the body after the muffler is 3D printed.

6. The apparatus of claim 4, further comprising a co-printed radiation shield surrounding an outer surface of the body and separated from the outer surface by an air gap.

7. The apparatus of claim 6, wherein the radiation shield comprises walls shaped to conform to the body and configured to reduce an outflow of thermal radiation due to exhaust gasses in the muffler.

8. The apparatus of claim 7, wherein the radiation shield is double-walled.

9. The apparatus of claim 1, being configured to be positioned in a rear impact path of the vehicle.

10. The apparatus of claim 1, wherein a lateral axis of the body is configured to be oriented between two crash rails and adjacent a rear vehicle bumper.

11. The apparatus of claim 10, wherein a longitudinal axis of the body is further configured to be positioned between the engine and the rear vehicle bumper.

12. The apparatus of claim 1, further comprising a suspension structure coupled to the body and configured to suspend the muffler between two crash rails near a rear bumper of the vehicle.

13. The apparatus of claim 12, wherein the suspension structure is further configured to isolate the muffler from a chassis of the vehicle.

14. The apparatus of claim 1, wherein at least some of the walls are configured to align with a directional axis of a rear impact event to enable the controlled deformation to increase energy absorption.

15. The apparatus of claim 1, wherein regions of the body having non-perpendicular directional components to a direction of the impact event are configured to controllably deform during the impact event.

16. The apparatus of claim 15, wherein the regions of the body include the posterior wall and side vertical walls.

17. The apparatus of claim 1, wherein portions of at least one of the inlet pipe or the outlet pipe are configured to absorb energy by deforming during the impact event.

18. The apparatus of claim 1, wherein the walls and the resonator cells are oriented and sized to achieve precise (i) energy absorption during the impact event and (ii) vehicle noise suppression.

19. The apparatus of claim 1, further comprising:
a suspension rod; and
a suspension base separate from a chassis of the vehicle.

20. A multifunction noise suppression and energy absorption structure for a vehicle, comprising:
a muffler including a body, an inlet pipe, an outlet pipe, a posterior wall, and a plurality of internal walls within the body that bound an array of resonator cells;
wherein the internal walls are configured to absorb energy by deforming during an impact,
wherein the resonator cells are concentrated more densely the further their distance from the posterior wall,
wherein a length of at least one of the walls is aligned within an angle of 0° to 45° (degrees) from a direction parallel to a predicted direction of the impact event,
wherein the body comprises lateral sides with a longitudinal axis between the lateral sides, and
wherein an outlet pipe opening is on an upper portion of the muffler and between the lateral sides.

21. The structure of claim 20, wherein the resonator cells are positioned between the inlet and outlet pipes to enable exhaust gasses to flow therebetween.

22. The structure of claim 20, wherein the body is configured to be longitudinally positioned between crash rails of the vehicle to reduce energy absorbed by the crash rails during the impact.

23. The structure of claim 20, wherein the body comprises a plurality of outer walls that are arranged to define external surfaces.

24. The structure of claim 23, wherein one or more of the outer walls are configured to controllably deform during the impact.

25. The structure of claim 23, wherein at least portions of the inlet and outlet pipes are configured to controllably deform during the impact.

26. The structure of claim 23, further comprising a suspension structure coupled to the body and configured to allow suspension of the muffler between the rear bumper and the engine in a plane of a rear impact,
wherein the engine is located between a passenger cabin of the vehicle and the rear bumper.

27. The structure of claim 20, wherein the muffler comprises a material configured to absorb energy during an impact while being at a temperature of at least 1000° (degrees) Celsius.

28. The structure of claim 20, wherein the muffler is 3D printed.

29. The structure of claim 28, wherein the muffler comprises a plurality of powder holes configured to enable removal of loose powder after the muffler is 3D printed.

30. The structure of claim 28, further comprising a radiation shield co-printed over an outer surface of the body to form an air gap between the radiation shield and an outer surface of the body.

31. The structure of claim 20, wherein at least some of the internal walls are configured to be aligned with a statistically predicted direction of the impact.

32. A dual function muffler, comprising:
a housing;
an inlet pipe;
an outlet pipe;
a posterior surface; and
a plurality of internal walls defining resonator cells, the internal walls being configured to deform during an impact event,
wherein the resonator cells are concentrated more densely the further their distance from the posterior surface,
wherein a length of at least one of the walls is aligned within an angle of 0° to 45° (degrees) from a direction parallel to a predicted direction of the impact event,
wherein the body comprises lateral sides with a longitudinal axis between the lateral sides, and
wherein an outlet pipe opening is on an upper portion of the muffler and between the lateral sides.

33. The muffler of claim 32, wherein a lateral axis of the housing is configured to be positioned between rear crash rails to enable the muffler to reduce energy absorbed by the crash rails and to protect a vehicle occupant cabin during an impact event.

34. The muffler of claim 32, wherein:
the internal walls are disposed in a horizontal direction of the housing and along a vertical direction of the housing to form the at least a portion of the resonator cells; and
wherein the resonator cells are concentrated more densely the further their distance from the posterior surface further comprises:
the horizontally-arranged internal walls are progressively spaced closer together when moving from the posterior surface of the housing toward an upper surface of the housing such that a denser concentration of walls, and smaller resonator cells, are present near the upper surface.

35. The muffler of claim 34, wherein the upper surface of the housing is configured to be aligned more closely with a direction of the impact event than is the posterior surface.

36. The muffler of claim 34, wherein one or more of the inlet pipe, the outlet pipe, and the housing are configured to controllably deform during the impact event.

\* \* \* \* \*